(12) United States Patent
Gu et al.

(10) Patent No.: US 12,071,115 B2
(45) Date of Patent: Aug. 27, 2024

(54) AUTOMATIC BRAKING SYSTEM AND METHOD AND VEHICLE

(71) Applicant: NIO TECHNOLOGY (ANHUI) CO., LTD, Hefei (CN)

(72) Inventors: Yufeng Gu, Hefei (CN); Hongshuai Wang, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 172 days.

(21) Appl. No.: 17/695,113

(22) Filed: Mar. 15, 2022

(65) Prior Publication Data

US 2022/0297643 A1 Sep. 22, 2022

(30) Foreign Application Priority Data

Mar. 16, 2021 (CN) .......................... 202110280110.8

(51) Int. Cl.
*B60T 7/12* (2006.01)
*B60W 10/08* (2006.01)
(Continued)

(52) U.S. Cl.
CPC .............. *B60T 7/12* (2013.01); *B60W 10/08* (2013.01); *B60W 10/184* (2013.01);
(Continued)

(58) Field of Classification Search
CPC ................................. B60T 7/12; B60W 30/17
See application file for complete search history.

(56) References Cited

U.S. PATENT DOCUMENTS 6,056,374 A 5/2000 Hiwatashi
2016/0001781 A1* 1/2016 Fung ........................ G07C 9/37
701/36
(Continued)

FOREIGN PATENT DOCUMENTS

CN 110155046 8/2019
CN 110606082 12/2019
(Continued)

OTHER PUBLICATIONS

Extended Search Report for European Patent Application No. 22162359.8, dated Aug. 10, 2022, 8 pages.
(Continued)

*Primary Examiner* — Long T Tran
(74) *Attorney, Agent, or Firm* — Sheridan Ross P.C.

(57) ABSTRACT

The invention provides an automatic braking system and method and a vehicle. The automatic braking method comprises: entering an automatic braking process when a vehicle speed is less than a predetermined speed threshold value and a driver completely releases an accelerator pedal, wherein the automatic braking process comprises: detecting surrounding information by a sensing module; determining a target stop position based on the surrounding information, and determining a braking deceleration based on the target stop position; adjusting a motor and a braking system to slow down a vehicle at the predetermined braking deceleration and to stop the vehicle at the target stop position; and automatically activate an autohold system upon the vehicle stopping at the target stop position. The method and device according to embodiments of the invention can enable completely automatic braking and holding. The method and device according to embodiments of the invention can enable completely automatic braking and holding.

15 Claims, 2 Drawing Sheets

(51) Int. Cl.
*B60W 10/184* (2012.01)
*B60W 30/17* (2020.01)
*B60W 30/18* (2012.01)

(52) U.S. Cl.
CPC .... *B60W 30/18109* (2013.01); *B60T 2220/06* (2013.01); *B60T 2250/04* (2013.01); *B60W 2520/10* (2013.01); *B60W 2540/10* (2013.01); *B60W 2710/08* (2013.01); *B60W 2710/18* (2013.01)

(56) References Cited

U.S. PATENT DOCUMENTS

| | | | | |
|---|---|---|---|---|
| 2016/0257288 | A1* | 9/2016 | Miller | B60W 30/18109 |
| 2017/0043767 | A1* | 2/2017 | Khafagy | B60W 30/16 |
| 2018/0065638 | A1 | 3/2018 | Kawahara et al. | |
| 2018/0072285 | A1* | 3/2018 | Tanaka | F16D 55/226 |
| 2018/0074498 | A1* | 3/2018 | Koike | B60W 60/001 |
| 2019/0135302 | A1* | 5/2019 | Kishi | B60W 10/184 |
| 2021/0061268 | A1* | 3/2021 | Ike | B60T 8/17558 |
| 2021/0078557 | A1* | 3/2021 | Kobune | B60T 13/741 |
| 2022/0161769 | A1* | 5/2022 | Muramatsu | B60T 7/22 |

FOREIGN PATENT DOCUMENTS

| | | |
|---|---|---|
| CN | 111547035 | 8/2020 |
| CN | 112435482 | 3/2021 |
| DE | 112017008084 | 6/2020 |
| EP | 3772441 | 2/2021 |
| EP | 3789254 | 3/2021 |
| WO | WO 2013/053563 | 4/2013 |

OTHER PUBLICATIONS

Official Action with English Translation for China Patent Application No. 202110280110.8, dated May 23, 2024, 13 pages.

* cited by examiner

AUTOMATIC BRAKING SYSTEM AND METHOD AND VEHICLE

CROSS-REFERENCE TO RELATED APPLICATION

This application claims the benefit of China Patent Application No. 202110280110.8 filed Mar. 16, 2021, the entire contents of which are incorporated herein by reference in its entirety.

TECHNICAL FIELD

The invention relates to the field of automatic vehicle control, and more specifically, to an automatic braking system and method for a vehicle and a vehicle configured with the automatic braking system.

BACKGROUND ART

As a vehicle population owned by all residents rises, urban traffic jams get worse increasingly. Vehicles need to be started and stopped frequently in the traffic jam. To start and stop the vehicle in the traffic jam, a driver needs to control an accelerator pedal and a brake pedal frequently, resulting in a fatigue feeling during driving.

Currently, vehicles are usually configured with an autohold function. After the vehicle stops steadily, the driver needs to activate the autohold function for example by forcefully depressing the brake pedal, or by controlling a manipulating lever or a button, etc., instead of using a hand brake. At this time, the driver may release the brake pedal and the vehicle will not slip. When startup is required, the driver only needs to depress the accelerator pedal without need for releasing the hand brake.

Although the existing autohold function allows driver's operations to be reduced, the driver still needs to actively activate this function. In the case of frequent startup and stop, an autohold system rarely helps the driver.

SUMMARY OF THE INVENTION

An object of the invention is to solve or at least alleviate the problems present in the prior art.

According to some aspects, an automatic braking method is provided, comprising:
  entering an automatic braking process when a vehicle speed is less than a predetermined speed threshold value and a driver completely releases an accelerator pedal, wherein the automatic braking process comprises:
  detecting surrounding information by a sensing module;
  determining a target stop position based on the surrounding information, and determining a braking deceleration based on the target stop position;
  adjusting a motor and a braking system to slow down a vehicle at the braking deceleration and to stop the vehicle at the target stop position; and
  automatically activating an autohold system upon the vehicle stopping at the target stop position.

Optionally, in the method, the predetermined speed threshold value is within a range from 10 km/h to 40 km/h.

Optionally, in the method, the sensing module comprises a camera, a radar and/or a satellite positioning receiver.

Optionally, in the method, the surrounding information comprises one or more of: a position of a front vehicle, a traffic light, lane lines at an intersection, obstacles, a lane slope, pedestrians, mopeds and motorcycles.

Optionally, the method further comprises: calculating a predetermined braking and stopping distance based on an initial speed when entering the automatic braking process and a preset deceleration, analyzing the surrounding information and determining if obstructive factors exist within the predetermined braking and stopping distance, and if no, braking at the preset deceleration, and automatically activating the autohold system upon the vehicle stopping at the predetermined braking and stopping distance. Optionally, in the method, the method further includes, in the automatic braking process, exiting from the automatic braking process when the driver stamps the accelerator pedal.

Optionally, in the method, after the autohold system is automatically activated, the autohold system is deactivated when a torque corresponding to the driver's operation of depressing the accelerator pedal is greater than a resistance from a slope on which the vehicle is located, and the displacement of the accelerator pedal is modified based on a gradient of the slope on which the vehicle is located.

According to another aspect, an automatic braking system is provided, comprising:
  a sensing module adapted to acquire surrounding information; and
  a control module connected to the sensing module and configured to enter an automatic braking process when a vehicle speed is less than a predetermined speed threshold value and a driver completely releases an accelerator pedal, the automatic braking process comprising:
  acquiring surrounding information by the sensing module and transmitting the surrounding information to the control module;
  wherein the control module is configured to: determine a target stop position based on the surrounding information, and determining a braking deceleration based on the target stop position; adjust a motor and a braking system to slow down a vehicle at the braking deceleration and to stop the vehicle at the target stop position; and automatically activate an autohold system upon the vehicle stopping at the target stop position.

Optionally, in the automatic braking system, the predetermined speed threshold value is within a range from 10 km/h to 40 km/h.

Optionally, in the automatic braking system, the sensing module comprises a camera, a radar and/or a satellite positioning receiver.

Optionally, in the automatic braking system, the surrounding information comprises one or more of: a position of a front vehicle, a traffic light, lane lines at an intersection, obstacles, a lane slope, pedestrians, mopeds and motorcycles.

Optionally, in the automatic braking system, the control module is further preset with a preset deceleration, the control module calculates a predetermined braking and stopping distance based on an initial speed when entering the automatic braking process and a preset deceleration, and the control module further analyzes the environmental information and determines if obstructive factors exist within the predetermined braking and stopping distance, and if no, applies braking at the preset deceleration, and automatically activates the autohold system upon the vehicle stopping at the predetermined braking and stopping distance.

Optionally, in the automatic braking process, when the driver depresses the accelerator pedal during the automatic braking process, the automatic braking process is exited.

Optionally, in the automatic braking system, after the autohold system is automatically activated, the autohold system is deactivated when a torque corresponding to the driver's operation of depressing the accelerator pedal is greater than a resistance from a slope on which the vehicle is located, and the displacement of the accelerator pedal is modified based on a gradient of the slope on which the vehicle is located.

A vehicle is further provided, wherein the vehicle comprises an automatic braking systems according to various embodiments.

The method and device according to embodiments of the invention can enable completely automatic braking and holding.

BRIEF DESCRIPTION OF THE DRAWINGS

The disclosure of the invention will become more readily understood with reference to the accompanying drawings. Those skilled in the art will readily appreciate that the accompanying drawings are merely for illustrative purposes and are not intended to limit the scope of protection of the invention. In addition, like parts are indicated by like numbers in the figures, in which.

DETAILED DESCRIPTION OF EMBODIMENTS

It can be readily understood that according to the technical solution of the invention, a person of ordinary skill in the art may propose multiple interchangeable structures and implementations without changing the essential spirit of the invention. Therefore, the following specific embodiments and the accompanying drawings are merely exemplary descriptions of the technical solutions of the invention, and should not be construed as the entirety of the invention or construed as limiting the technical solution of the invention.

Figure 1:
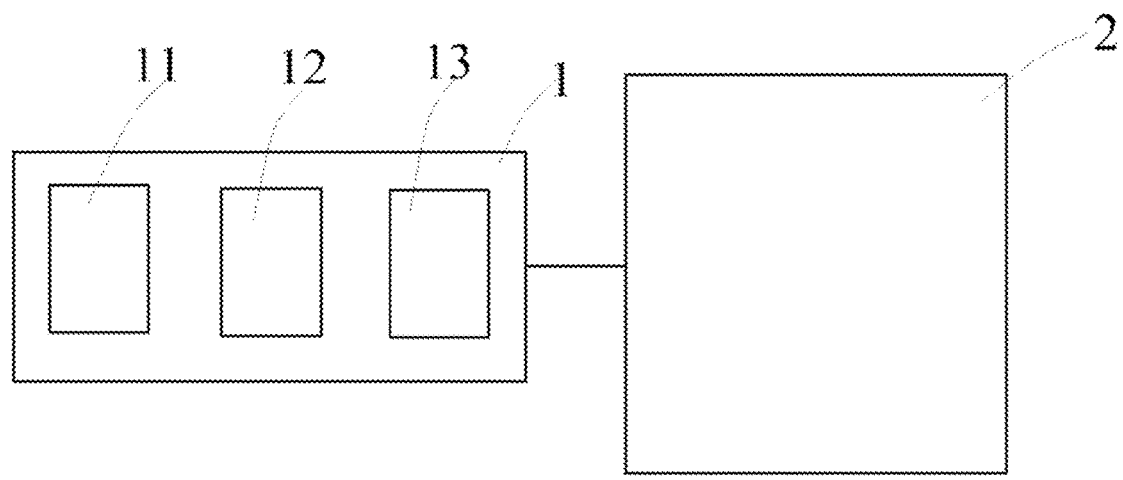
FIG. 1 illustrate a structural schematic diagram of an automatic braking system according to an embodiment of the invention.

Referring to FIG. 1, which illustrates a schematic diagram of an automatic braking system according to an embodiment of the invention. The automatic braking system according to the embodiment of the invention may comprise: a sensing module 1 and a control module 2. The sensing module 1 may comprise a plurality of sensors and signal receivers to receive various surrounding information. In some embodiments, the sensing module 1 may comprise a camera 11, a radar 12 and/or a satellite positioning receiver 13, and the like. The camera 11 may be, for example, a 2D camera and/or a 3D deep camera, and the like, and the radar 12 may be, for example, a millimeter-wave radar, a laser radar, or the like. The satellite positioning receiver receives satellite positioning information and cooperates with a high-precision map to realize functions such as determination of vehicle positions. The control module 2 is connected to the sensing module 1 to receive various surrounding information provided by the sensing module 1. The control module 2 may comprise elements such as a processor, a microprocessor and a memory, and may execute various calculations and control treatments. The control module 2 is configured to automatically enter an automatic braking process when a vehicle speed is less than a predetermined speed threshold value and a driver completely releases an accelerator pedal. In the automatic braking process: first, the sensing module 1 detects the surrounding information, and transmits the surrounding information to the control module 2; then, the control module 2 determines a target stop position based on the surrounding information, and determines a braking deceleration, for example, based on a current vehicle speed and the target stop position; next, the control module 2 slows down the vehicle at the braking deceleration and stops the vehicle at the target stop position by adjusting a motor and a braking system; and an autohold system is automatically activated upon the vehicle stopping at the target stop position. In some embodiments, the autohold system may be implemented by a commercially available product, for example, an EPB or an ibooster, or other braking systems. By means of the automatic braking system, all braking and holding steps are completely automatically executed when the vehicle travels at a low speed, and in particular the driver completely does not need to depress the brake pedal in the case of urban traffic jams, improving the driving experience in the urban traffic jams. Meanwhile, for electric vehicles, the invention may recover most of mechanical energy generated in the process of speed reduction to stop, and increase the endurance mileage of the electric vehicles.

In some embodiments, the surrounding information may comprise: position information of a front vehicle, traffic light information, and information about lane lines at an intersection. For example, the position information of the front vehicle may be measured by the radar 12 and the camera 11; the traffic light information may be identified using, for example, the camera 11; and the information about the lane lines at the intersection may be determined using, for example, the camera 11, the satellite positioning receiver 13 and the high-precision map cooperatively. In some embodiments, the surrounding information may further comprise other information, for example information about obstacles, lane slopes, pedestrians, mopeds, motorcycles, etc. Such information may be acquired in a format of a picture and a video captured for example by the camera 11, and may be acquired by means of an image recognition function.

In some embodiments, the control module 2 is further preset with a preset deceleration; the control module 2 further calculates a predetermined braking and stopping distance based on an initial speed when entering the automatic braking process and the preset deceleration; then, the control module 2 analyzes the surrounding information and then determines if obstructive factors exist within the predetermined braking and stopping distance, and if no, which means that the vehicle is allowed by the surrounding information to stop at the predetermined braking and stopping distance, applies braking at the preset deceleration. For example, if no vehicles, obstacles, intersection lane lines, etc. are present within the predetermined braking and stopping distance in a front lane, the control module 2 may be configured to apply braking at the preset deceleration, and to automatically activate the autohold system when the vehicle stops at the predetermined braking and stopping distance. If obstacles, such as front vehicles, intersection lane lines, etc. are present within the predetermined braking and stopping distance, the target stop position and the braking deceleration are calculated based on the surrounding factors as mentioned above. It should be understood that the predetermined braking and stopping distance is a braking and stopping distance required for braking based on an initial braking speed and the preset deceleration; the initial braking speed is a vehicle speed when the driver releases the accelerator pedal when entering the automatic braking process; the predetermined deceleration may be set by a manufacturer empirically, and should be a moderate braking deceleration which brings good experience to a user during braking. Therefore, the predetermined braking and stopping distance varies with the initial braking speed of the vehicle. In some embodiments, the predetermined speed threshold value may be within a range from 10 km/h to 40 km/h, for example, the predetermined speed threshold value may be less than 30 km/h. For example, the predetermined speed threshold value may be set at 20 km/h, which means that the automatic braking system works only in the case of low-speed traveling, and in particular, in the case of urban traffic jams, the driver only needs to depress the accelerator pedal, and when braking is required, to release the accelerator pedal without depressing the brake pedal, and the autohold function may allow the vehicle not to slip even on a slope, thereby greatly reducing driver's operations and improving the driving experience in such conditions. In some embodiments, the predetermined speed threshold value may be set at 15 km/h, 20 km/h, 25 km/h, 30 km/h, 35 km/h, or within a range defined by any two of the previous values as endpoints (inclusive).

In some embodiments, in the automatic braking process, if the deliver depresses the accelerator pedal, the control module 2 automatically exits the automatic braking process, and the vehicle returns to normal traveling so that the automatic braking method will not influence the normal driving operation of the driver.

In some embodiments, the control module 2 is configured to, after the autohold system is activated, deactivate the autohold system when a torque corresponding to the driver's operation of depressing the accelerator pedal is greater than a resistance from a slope on which the vehicle is located, and correct the displacement of the accelerator pedal based on a gradient of the slope on which the vehicle is located. Thanks to this configuration, the driver does not need to perform a single operation to terminate a parking state.

Figure 2:
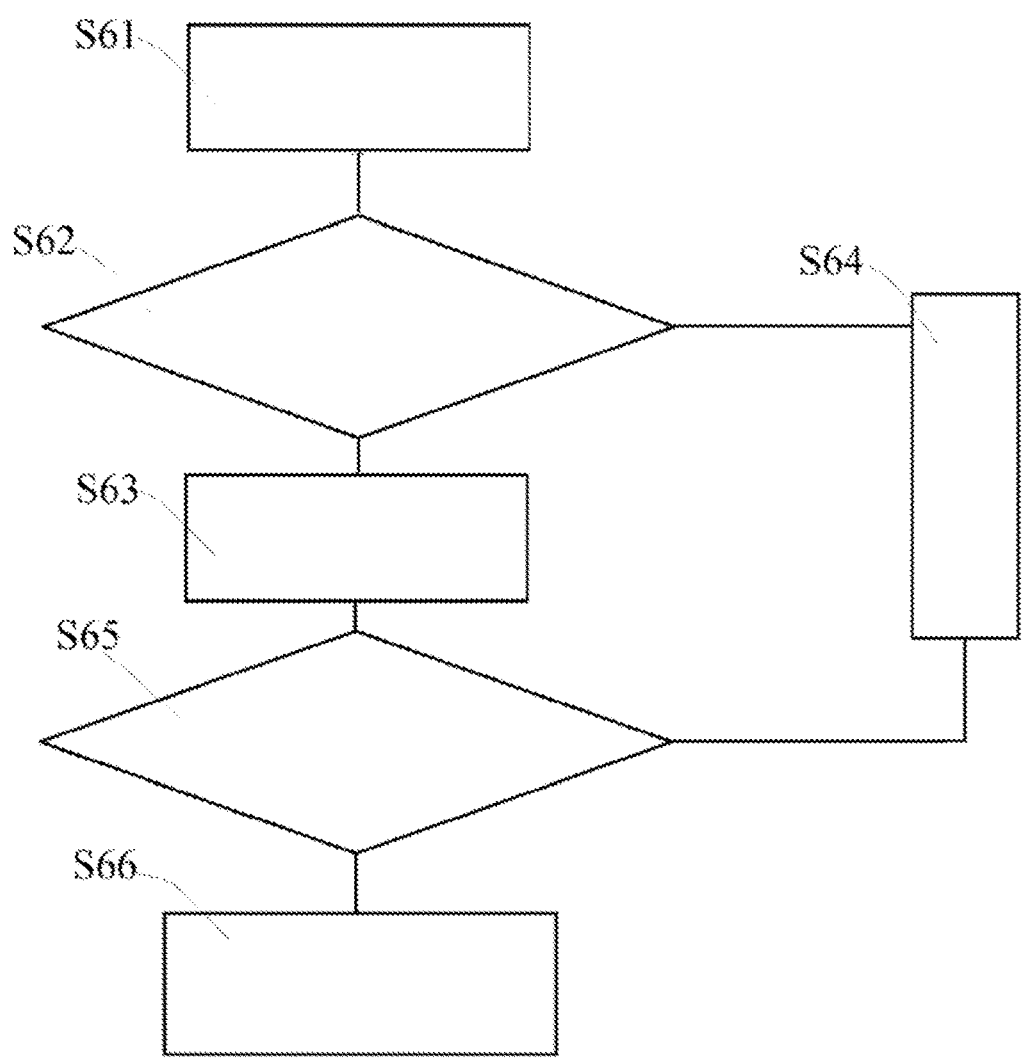
FIG. 2 illustrates conditions for entering an automatic braking process according to an embodiment of the invention.
Figure 3:
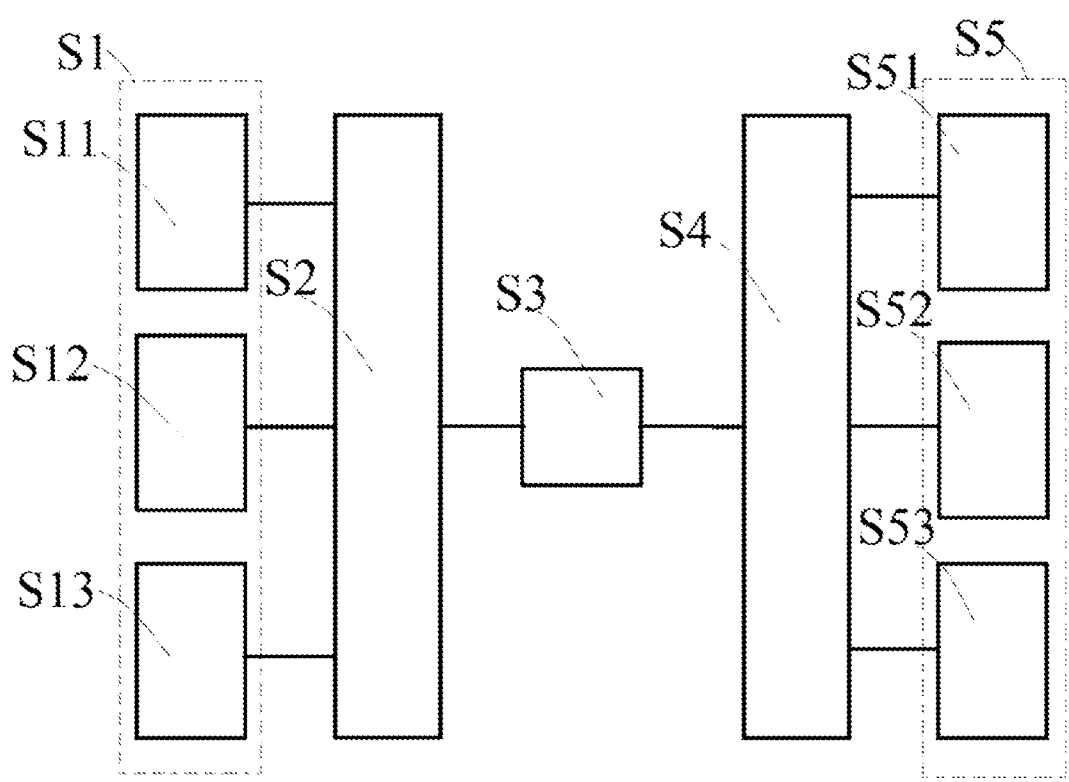
FIG. 3 illustrates a schematic diagram of the automatic braking process according to an embodiment of the invention.

The automatic braking method according to embodiments of the invention continues to be described with reference to FIGS. 2 and 3. First, refer to FIG. 2, which illustrates conditions for entering the automatic braking process. The conditions comprise: at step S61, the driver releases the accelerator pedal; at step S62, it is determined that a current vehicle speed is less than the predetermined speed threshold value, if less, step S63 is executed, or if not less, step S64 is executed, which means entering the automatic braking process; at step S63, the automatic braking process is entered and begins; and, at step S66, the automatic braking process is finished, and the vehicle is automatically parked; from step S63 to step S66, namely in the automatic braking process, it is determined that the driver depresses the accelerator pedal actively at step S65, if so, step S64 is executed, which means exiting the automatic braking process such that the vehicle travels normally, and if not, the automatic braking process continues to be executed. In some embodiments, in step S62 mentioned above, if the predetermined speed threshold value is less than 30 km/h, for example, the threshold value may be set at 20 km/h, which means that when the vehicle speed is greater than 20 km/h when the accelerator pedal is released, step S64 is executed, and the vehicle travels normally; otherwise, step S63 is executed, and the automatic braking process begins.

Referring to FIG. 3 again, which depicts a schematic diagram of the automatic braking process, detection of the surrounding information is performed at step S1, including measurement of a distance to the front vehicle by the camera 11 at step S11, measurement of the distance to the front vehicle by the radar 12 at step S12, and determination of a distance to a front lane line by the positioning system 13 and the high-precision map at step S13. At step S1, other surrounding information, such as information about obstacles, lane slopes, pedestrians, mopeds, motorcycles, etc., may further be acquired. At step S2, the control module 2 fuses the surrounding information, and determines the target stop position which is also called a target braking and stopping distance. Subsequently, at step S3, the control module 2 determines the braking deceleration and sends a speed reduction request; then, at step S4, speed reduction closed control is implemented; and finally, a target deceleration is applied in a coordinated way at step S5, including control of a motor torque output from a motor at step S51, control of a braking torque output from a braking device at step S52, and control of the autohold system to execute the autohold operation after the vehicle stops at the target stop position at step S53. It should be understood that in the automatic braking process, if the driver performs any operation such as depressing the accelerator pedal, the control module 2 will exit the automatic braking process such that the vehicle will return to normal operations.

According to another aspect of the invention, a vehicle is further provided, wherein the vehicle comprises an automatic braking system according to the various embodiments.

According to the device and method of the invention, the driver only needs to depress or release the accelerator pedal in the case of urban traffic jams without the need of depressing the brake pedal, thereby simplifying driver's operations. In addition, in the case of electric vehicles, the device and method of the invention may recover energy to the maximum extent to improve the endurance mileage of vehicles.

The particular embodiments described above are intended merely to more clearly describe the principles of the invention, in which each component is clearly shown or described in order to facilitate a better understanding of the principles of the invention. Various modifications or variations to the invention could be readily made by those skilled in the art without departing from the scope of the invention. It should therefore be understood that such modifications or variations are intended to be included within the scope of protection of the invention.

The invention claimed is:

1. An automatic breaking method, comprising:
entering an automatic braking process when a) a vehicle speed is less than a predetermined speed threshold value and b) a driver completely releases an accelerator pedal from depressing, wherein the automatic braking process comprises:
detecting surrounding information by a sensing module;
determining a target stop position based on the surrounding information, and determining a braking deceleration based on the target stop position;
adjusting a motor and a braking system to slow down a vehicle at the braking deceleration and to stop the vehicle at the target stop position; and
automatically activating an autohold system upon the vehicle stopping at the target stop position.

2. The method according to claim 1, wherein the predetermined speed threshold value is within a range from 10 km/h to 40 km/h.

3. The method according to claim 1, wherein the sensing module comprises a camera, a radar and/or a satellite positioning receiver.

4. The method according to claim 1, wherein the surrounding information comprises one or more of: a position of a front vehicle, a traffic light, lane lines at an intersection, obstacles, a lane slope, pedestrians, mopeds and motorcycles.

5. The method according to claim 4, further comprising: calculating a predetermined braking and stopping distance based on an initial speed when entering the automatic braking process and a preset deceleration, analyzing the surrounding information and determining if obstructive factors exist within the predetermined braking and stopping distance, and if no, braking at the preset deceleration, and automatically activating the autohold system upon the vehicle stopping at the predetermined braking and stopping distance.

6. The method according to claim 1, further comprising exiting the automatic braking process when the driver depresses the accelerator pedal during the automatic braking process.

7. The method according to claim 1, further comprising after automatically activating the autohold system, deactivating the autohold system when a torque corresponding to the driver's operation of depressing the accelerator pedal is greater than a resistance from a slope on which the vehicle is located, and modifying the displacement of the accelerator pedal based on a gradient of the slope on which the vehicle is located.

8. An automatic braking system, comprising:
a sensing module adapted to acquire surrounding information; and
a control module connected to the sensing module and configured to enter an automatic braking process when a) a vehicle speed is less than a predetermined speed threshold value and b) a driver completely releases an accelerator pedal from depressing, the automatic braking process comprising:
acquiring surrounding information by the sensing module and transmitting the surrounding information to the control module;
wherein the control module is configured to: determine a target stop position based on the surrounding information, and determining a braking deceleration based on the target stop position; adjust a motor and a braking system to slow down a vehicle at the braking deceleration and to stop the vehicle at the target stop position; and automatically activate an autohold system upon the vehicle stopping at the target stop position.

9. The automatic braking system according to claim 8, wherein the predetermined speed threshold value is within a range from 10 km/h to 40 km/h.

10. The automatic braking system according to claim 8, wherein the sensing module comprises a camera, a radar and/or a satellite positioning receiver.

11. The automatic braking system according to claim 8, wherein the surrounding information comprises one or more of: a position of a front vehicle, a traffic light, lane lines at an intersection, obstacles, a lane slope, pedestrians, mopeds and motorcycles.

12. The automatic braking system according to claim 11, wherein the control module is further preset with a preset deceleration, the control module calculates a predetermined braking and stopping distance based on an initial speed when entering the automatic braking process and a preset deceleration, and the control module further analyzes the surrounding information and determines if obstructive factors exist within the predetermined braking and stopping distance, and if no, applies braking at the preset deceleration, and automatically activates the autohold system upon the vehicle stopping at the predetermined braking and stopping distance.

13. The automatic braking system according to claim 8, wherein when the driver depresses the accelerator pedal during the automatic braking process, the automatic braking process is exited.

14. The automatic braking system according to claim 8, wherein after the autohold system is automatically activated, the autohold system is deactivated when a torque corresponding to the driver's operation of depressing the accelerator pedal is greater than a resistance from a slope on which the vehicle is located, and the displacement of the accelerator pedal is modified based on a gradient of the slope on which the vehicle is located.

15. A vehicle, comprising an automatic braking system, wherein the automatic braking system comprises:
a sensing module adapted to acquire surrounding information; and
a control module connected to the sensing module and configured to enter an automatic braking process when a) a vehicle speed is less than a predetermined speed threshold value and b) a driver completely releases an accelerator pedal from depressing, the automatic braking process comprising:
acquiring surrounding information by the sensing module and transmitting the surrounding information to the control module;
wherein the control module is configured to: determine a target stop position based on the surrounding information, and determining a braking deceleration based on the target stop position; adjust a motor and a braking system to slow down a vehicle at the braking deceleration and to stop the vehicle at the target stop position; and automatically activate an autohold system upon the vehicle stopping at the target stop position.

* * * * *